United States Patent [19]

Jonsson

[11] 4,098,152

[45] Jul. 4, 1978

[54] CHUCK KEY

[76] Inventor: Åke Lennart Jonsson, Backavägen 17 G, S-641 00 Katrineholm, Sweden

[21] Appl. No.: 748,529

[22] Filed: Dec. 8, 1976

[30] Foreign Application Priority Data

Dec. 9, 1975 [SE] Sweden ................................ 7513838

[51] Int. Cl.[2] ................................................ B23B 31/06

[52] U.S. Cl. ..................................... 81/90 A; 279/1 K

[58] Field of Search .................... 279/1 K; 408/241 R; 81/90 A, 125, 180 R, 71

[56] References Cited

U.S. PATENT DOCUMENTS 1,428,566 9/1922 Timmerman ........................ 81/71 R

FOREIGN PATENT DOCUMENTS 548,615 10/1942 United Kingdom ................ 81/71 R 876,781 9/1961 United Kingdom ................ 81/71 R

*Primary Examiner*—Othell M. Simpson

*Assistant Examiner*—Z. R. Bilinsky

[57] ABSTRACT

A chuck key has a key shaft with an key head having four lateral engagement surfaces. A series of bevels are formed in the axial edges of the engagement surfaces adjacent the juncture of the key head and shaft and also each engagement surface continues into a tapered polyhedron surface defining the tip of the key head, so that the key will be thrown out of a chuck if the chuck begins to rotate.

2 Claims, 5 Drawing Figures

Fig. 1
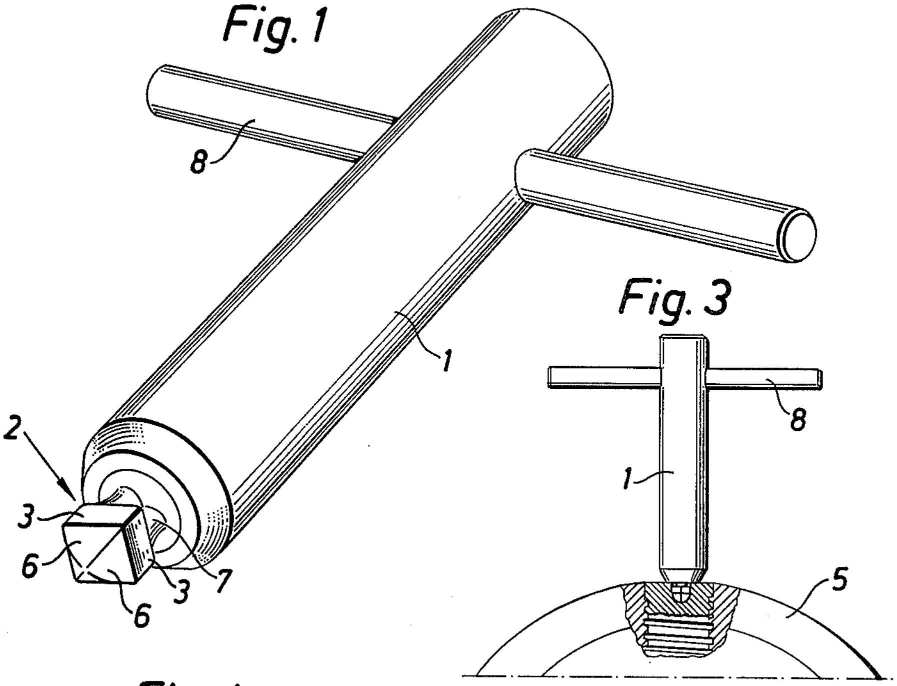
Fig. 3
Fig. 4
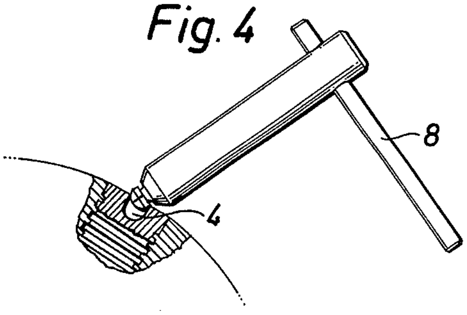
Fig. 2
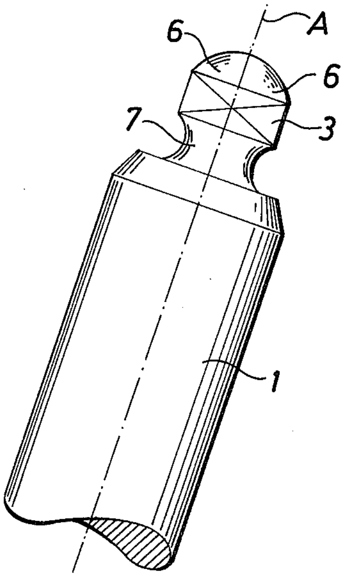
Fig. 5
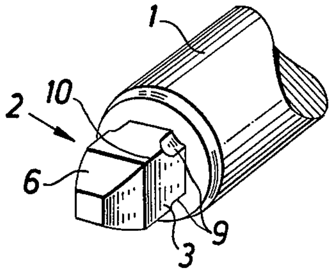

CHUCK KEY

BACKGROUND OF THE INVENTION

The present invention relates to a chuck key and expecially to a chuck key for lathe chucks although the invention also relates to keys for devices intended to grip tools or workpieces during rotation.

A typical chuck key comprises a key shaft with a key-head provided with four lateral planar engagement surfaces, for detachable engagement with a corresponding swuare recess in the chuck.

In general such chuck keys have the drawback that if the lathe is accidentally started whilst the key is in the chuck they do not become disengaged and serious accidents may result. It is not unusual for the lathe operator to have forgotten to remove the key from the chuck before starting up the machine.

Attempts have already been made to solve this problem by means of relatively complicated constructions, such as key-ejectors consisting of a spring-loaded sleeve or peg arranged to eject the key when the machine is started. However, such ejectors lead to a clumsy or complex chuck or key construction and the key is therefore difficult to manipulate since it requires a considerable force to insert it into the engagement position in the chuck. Because of their complicated design, such key-ejectors are also expensive to manufacture.

OBJECT OF THE INVENTION

The object of the present invention is to provide a convenient chuck key, simple in design, but giving reliable ejection of the key from an engagement position if a machine in which the key is inserted is started up involuntarily or accidentally.

SUMMARY OF THE INVENTION

In a chuck key in accordance with the invention a peripheral recess intended as a free groove is provided between the engagement head and the key shaft, and the engagement surface of the key head continue into slanting release surfaces which extend towards the center line of the key shaft.

The free groove may consist of a peripheral recess between the engagement head and the shaft, or alternatively, the free groove may consist of a bevel extending towards the shaft in the edges of the engagement surfaces adjacent the shaft.

The extension of each engagement surface in the direction away from the recess preferably continues into a dome-shaped, arched surface defining the tip of the key shaft.

BRIEF DESCRIPTION OF THE DRAWINGS

The characteristics of the present invention will be better understood from the following description of two embodiments, given by way of non-limiting example, and with reference to the accompanying drawings, in which:

FIG. 1 is a perspective view of a first embodiment of a chuck key in accordance with the invention, FIG. 2 is a side view of the head of the chuck key shown in FIG. 1, FIG. 3 shows a chuck key constructed as illustrated in FIG. 1 in engagement with a corresponding recess, FIG. 4 shows how the chuck key illustrated in FIG. 1 is forcibly removed from its engagement position in the event of unbalance, and FIG. 5 is a perspective view of a second embodiment of a chuck key in accordance with the present invention.

DESCRIPTION OF THE PREFERRED EMBODIMENTS

The chuck keys shown in the drawings each comprise a key shaft 1 and a key head 2. The key head 2 comprises four substantially flat side surfaces 3 which are designed to act as engagement surfaces in a corresponding square recess 4 in a chuck 5. The engagement surfaces 3 of the head 2 continue into slanting release surfaces 6 which extend in the direction of the center line A and tip of the key. As shown in FIG. 1 in one embodiment a peripheral recess 7 is provided between the shaft 1 and the key head 2, said recess 7 being designed to serve as a free groove. A handle in the form of a rod 8 is also arranged in the key, said rod 8 being slidable in a known manner in a recess or aperture provided therefor in the key shaft.

As can be seen in FIG. 3, the chuck key can be caused to remain temporarily in an engagement position, for instance while a workpiece is being set up in the chuck, if the handle 8 is inserted symmetrically. However, the key will be forcibly dislocated as soon as unbalance occurs (see FIG. 4), for instance if the lathe or other machine with which the key is being used is started. The handle 8 will then be displaced and the engagement between the key and the chuck thus released.

A second embodiment of the invention is shown in FIG. 5. Here the peripheral recess 7 shown in FIG. 1 has been replaced by bevels 9 in the contacting edges 10 of the engagement surfaces, i.e. in those sections which are located close to the shaft, the bevels extending towards the axis of the shaft. A peripheral recess is thus provided in this manner, but with considerably less structural alteration in the base part of the engagement head closest to the shaft. The junction between engagement head and shaft is therefore strong while the effect sought after by the invention is retained. Together, the bevels 10 form parts of an imaginary circle incribed in the quadratic cross-section of the engagement head.

It will be understood that the invention is not limited to the embodiments shown in the drawing, but can be varied in many ways within the scope of the following claims.

What is claimed is:

1. A chuck key for operation of a chuck formed of an axially extending hole with one or more peripheral contact surfaces, comprising:

a key shaft having a handle at one end and a flat outer extremity provided with an annular peripheral chamfer;

a key head integral with said key shaft terminating at the outer extremity thereof in a polyhedral end portion having a plurality of uniform substantially flat engagement surfaces extending peripherally thereabout for cooperation with the contact surfaces of the chuck and a plurality of flat surfaces equal in number to the engagement surfaces respectively constituting extensions of said engagement surfaces directed axially away from said key shaft and inclined toward the center line of said key shaft, each of the edges between adjacent flat engagement surfaces being in part bevelled radially inwardly toward the axis of said key shaft, said bevels being restricted to the portions of the edges adjacent the juncture of said key head with said key shaft and cooperating with said inclined surfaces to permit automatic release of said key from the chuck when the axis of said chuck and said key are at an angle with respect to each other.

2. A chuck key according to claim 1 wherein said key head is provided with four engagement surfaces.

* * * * *